(12) United States Patent
Nguyen et al.

(10) Patent No.: US 7,084,780 B2
(45) Date of Patent: Aug. 1, 2006

(54) REMOTE CONTROL DEVICE FOR USE WITH A PERSONAL COMPUTER (PC) AND MULTIPLE A/V DEVICES AND METHOD OF USE

(75) Inventors: Huy Nguyen, San Jose, CA (US); Wayne Takata, Moraga, CA (US); Christos Kotsiopoulos, Brockton, MA (US)

(73) Assignee: Nvidia Corporation, Santa Clara, CA (US)

( * ) Notice: Subject to any disclaimer, the term of this patent is extended or adjusted under 35 U.S.C. 154(b) by 249 days.

(21) Appl. No.: 10/072,390

(22) Filed: Feb. 5, 2002

(65) Prior Publication Data

US 2004/0155791 A1   Aug. 12, 2004

(51) Int. Cl.
*G09G 5/00* (2006.01)
(52) U.S. Cl. .................... 340/825.69; 345/418
(58) Field of Classification Search ........... 340/825.69, 340/825.72, 825.24, 825.25, 825.22; 348/734, 348/731, 552; 345/418
See application file for complete search history.

(56) References Cited

U.S. PATENT DOCUMENTS

| | | | |
|---|---|---|---|
| 4,817,203 A * | 3/1989 | Tsurumoto et al. ......... 398/106 |
| 5,283,819 A | 2/1994 | Glick et al. .................... 379/90 |
| 5,650,831 A | 7/1997 | Farwell ........................ 348/734 |
| 5,675,390 A * | 10/1997 | Schindler et al. ............ 348/731 |
| 5,850,340 A | 12/1998 | York ............................. 364/188 |
| 5,900,867 A | 5/1999 | Schindler et al. ............ 345/327 |
| 5,903,259 A | 5/1999 | Brusky et al. ............... 345/168 |
| 5,920,308 A | 7/1999 | Kim ............................ 345/169 |
| 6,111,569 A | 8/2000 | Brusky et al. ............... 345/327 |
| 6,205,318 B1 | 3/2001 | Schindler et al. ............. 455/6.3 |
| 6,208,384 B1 | 3/2001 | Schultheiss .................. 348/552 |
| 6,255,961 B1 | 7/2001 | Van Ryzin et al. ...... 340/825.25 |
| 6,879,351 B1 * | 4/2005 | Brown ..................... 340/825.72 |
| 2001/0053274 A1 * | 12/2001 | Roelofs et al. ................ 386/46 |
| 2002/0171763 A1 * | 11/2002 | Stecyk et al. ................ 348/552 |
| 2004/0025189 A1 * | 2/2004 | Bauersachs et al. ......... 348/552 |

* cited by examiner

*Primary Examiner*—Brian Zimmerman

(57) ABSTRACT

Aspects for remotely controlling audio/visual (A/V) devices with a personal computer (PC) are described. The aspects include providing connection hardware for connecting a plurality of A/V devices to a PC. A remote control device with selectable buttons is provided for transmitting data signals wirelessly to the connection hardware. The plurality of A/V devices are controlled according to the data signals from button selections on the remote control device. Through the present invention, a multi-function wireless remote is disclosed which allows for full command of a plurality of A/V devices in a PC, such as a DVD player, TV receiver, Digital Video Recorder (DVR), and electronic programming guide. In this manner, PC users are ensured of a simplified and intuitive interactive PC/video experience.

15 Claims, 5 Drawing Sheets

| KEYS | IR CODE | DVD/CD FUNCTION | DVR FUNCTION |
|---|---|---|---|
| 0-9 | 0x00-0x08 | Number Keys | Number Keys |
| 10 | 0x09 | CD/DVD On/Off | N/A |
| 11 | N/A | N/A | TV/DVR On/Off |
| 12 | 0x11 | DVD Root Menu | EPG |
| 13 | 0x12 | DVD Language Select | Video Source Select |
| 14 | 0x13 | Enter | Playlist |
| 15 | 0x14 | Rewind | Rewind |
| 16 | 0x15 | Play/Pause | Play/Pause |
| 17 | 0x16 | Forward | Forward |
| 18 | 0x17 | Jump to previous chapter | Jump to last channel |
| 19 | 0x18 | Stop (Next) | Stop (Next) (Channel surfing) |
| 20 | 0x19 | Jump to next chapter | Go to Live TV while in Timeshift mode |
| 21 | 0x20 | Mute | Mute |
| 22 | 0x21 | Step in movies playing | Timeshift mode-enable TIVO-like functions |
| 23 | 0x22 | Up arrow | Full Screen TV toggle |
| 24 | 0x23 | Left arrow | Instant replay |
| 25 | 0x24 | Down arrow | Down arrow |
| 26 | 0x25 | Right arrow | Commercial Advance |
| 27 | 0x26 | Volume adjustment | Volume adjustment |
| 28 | 0x27 | OK/Select | OK/Select |
| 29 | 0x28 | DVD angle select | Channel up |
| 30 | 0x29 | DVD subtitle select | Channel down |
| 31 | 0x30 | Full Screen DVD toggle | Record |

FIGURE 5

REMOTE CONTROL DEVICE FOR USE WITH A PERSONAL COMPUTER (PC) AND MULTIPLE A/V DEVICES AND METHOD OF USE

FIELD OF THE INVENTION

The present invention relates generally to personal computer systems and more particularly to remote control devices for use with personal computer systems that include multiple A/V (audio/visual) devices.

BACKGROUND OF THE INVENTION

As the personal computer (PC) system has advanced, its role has evolved to include consumer entertainment options. For example, the provision of DVD (digital video disc) drives has become more and more standard in new PCs. Unlike standalone entertainment devices like TVs, DVRs, CD players, etc., the PC offers the ability to incorporate multiple device programming in a single unit, e.g., digital video recording (DVR) and DVD playback. However, some of the conveniences and expected options of the standalone consumer products have not been as readily available to PC users. In particular, one preferred component of an entertainment device is a remote control. While there has been some development of remote controls capable of interacting with PCs, their functionality is usually limited to a set of rudimentary controls for a single device through a separate add-on device connection to the PC. For example, one remote control is utilized to control the volume and the changing of speed of the video image of a DVD player associated with the PC, a second remote control is utilized to control the volume for an audio of a CD player associated with the PC and a third remote control for a TV functionality built into the PC. Furthermore, a remote control utilized in such a way with a PC does not typically allow for a variety of options to be controlled as well as providing for options related to other devices such as camcorders, video game consoles, TV, etc., that a PC could be coupled thereto or included therein. Accordingly, heretofore, a remote control could only be utilized with one device and could not be utilized to control other devices either attached thereto or provide thereby via software. A need remains for a remote control device offering more universal control capability of multiple audio/visual components provided via a PC. The present invention addresses such a need.

SUMMARY OF THE INVENTION

Aspects for remotely controlling audio/visual (A/V) devices with a personal computer (PC) are described. The aspects include providing connection hardware for connecting a plurality of A/V devices to a PC. A remote control device with selectable buttons is provided for transmitting data signals wirelessly to the connection hardware. The plurality of A/V devices are controlled according to the data signals from button selections on the remote control device.

Through the present invention, a multi-function wireless remote is disclosed which allows for full command of a plurality of A/V devices in a PC, such as a DVD player, TV receiver, Digital Video Recorder (DVR), and electronic programming guide. In this manner, PC users are ensured of a simplified and intuitive interactive PC/video experience. These and other advantages of the present invention will be more readily understood in conjunction with the following detailed description and accompanying drawings.

BRIEF DESCRIPTION OF THE DRAWINGS

FIG. 5 illustrates an example translation mechanism in accordance with a preferred embodiment of the present invention.

DETAILED DESCRIPTION

The present invention relates generally to personal computer systems and more particularly to remote control devices for use with personal computer systems that include multiple A/V (audio/visual) devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
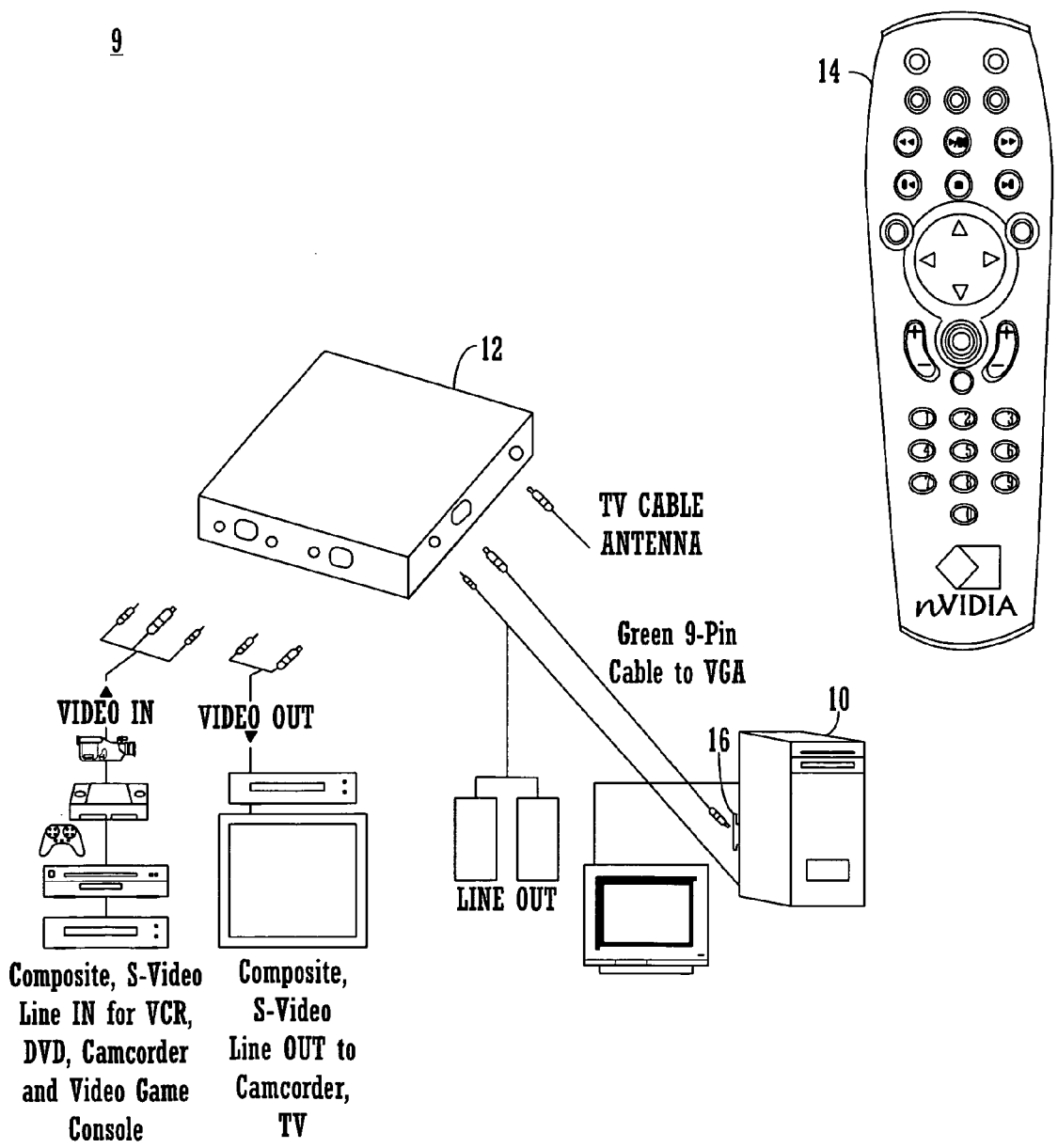
FIG. 1 illustrates a perspective view of a personal cinema system with remote control access.

In accordance with the present invention, a remote control for a PC is provided that has the capability to control multiple A/V devices in an integrated fashion. A preferred embodiment is described with reference to a Personal Cinema system available from Compro Technology, Inc. of Dong Guan City, China. FIG. 1 illustrates a perspective view of personal cinema system 9 with remote control access. The personal cinema system 9 includes a PC 10, a tuner box 12, and a remote control 14. Included in the PC 10 is a graphics card 16 that is connected via a cable to the tuner box 12. In a preferred embodiment, the tuner box 12 supports connections to multiple audio/visual (A/V) devices, including DVR, DVD, Camcorder, Video Game Console, TV, etc., as shown. Thus, the tuner box 12 and graphics card 16 provide the connection hardware for the multiple A/V devices to the PC 10. Further included in the tuner box 12 is an infrared (IR) port that receives IR signals sent by the remote control 14. Thus, the remote control 14 provides a wireless link for the user to the graphics card 16 and its associated programming in the PC.

Figure 2:
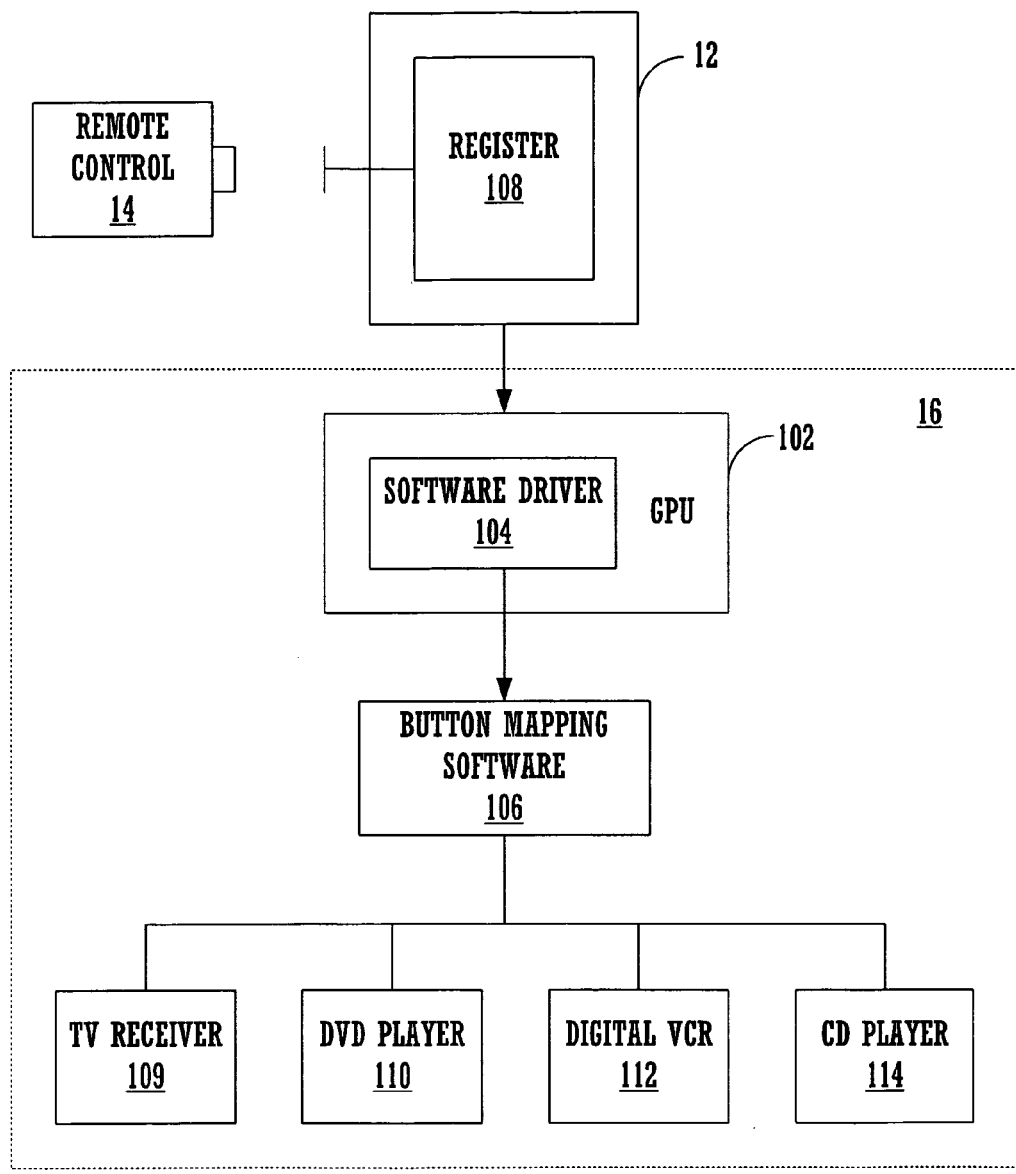
FIG. 2 is a simple block diagram of the key components of the personal cinema in accordance with the present invention.
Figure 3:
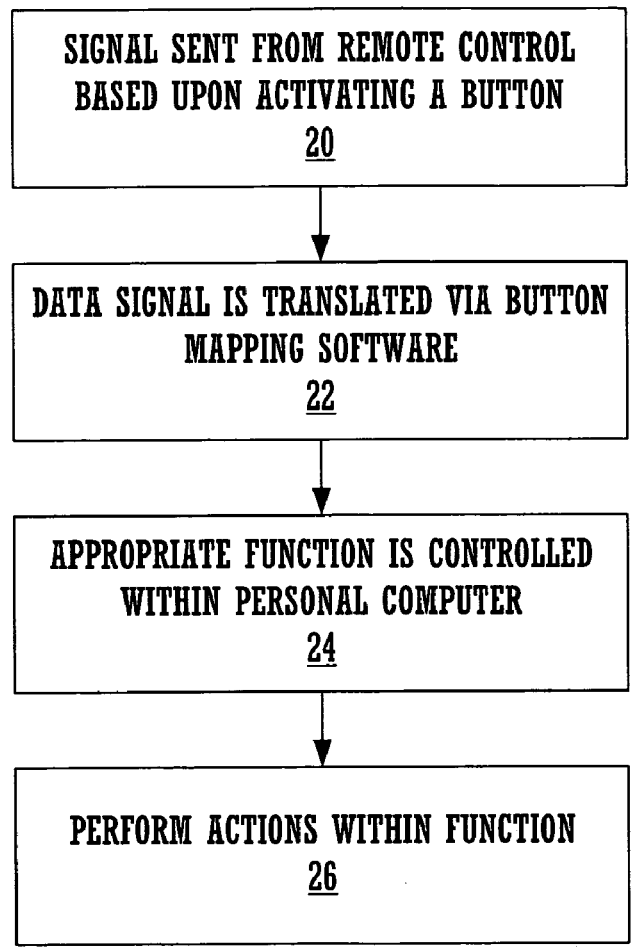
FIG. 3 is a flow diagram for remotely controlling a plurality of audio/visual devices by a remote control device utilizing a personal computer system.

In this manner, the remote control 14 of the present invention provides a single device with which the user can control the multiple A/V devices associated with a PC. In a preferred embodiment, the universal nature of the remote control 14 is achieved through a mapping of the button of the remote control to the different devices. To further describe this feature, please refer now to the following description. FIG. 2 is a simple block diagram of the key components of the personal cinema in accordance with the present invention. As is seen, the remote control 14 sends a signal (preferably infrared) to a register 108 within the tuner box 12. The register 108 provides data to a graphics processor unit (GPU) 102. The GPU 102 includes a software driver 104 that provides information for controlling the various A/V devices. The driver 104 provides the data to a button mapping software 106 that handles the various A/V devices that are in software within the PC. In this embodiment, a TV receiver 109, a DVD player 110, a DVR 112 and a CD player 114 are the A/V devices controlled by the remote control 14. However, it should be readily understood by one of ordinary skill in the art that although specific A/V devices are shown, a variety of devices can be utilized and their use would be within the spirit and scope of the present invention. FIG. 3 is a flow diagram for remotely controlling a plurality of A/V 104 devices by a remote control device utilizing a personal computer system. Referring now to FIGS. 1, 2 and 3 together, the remote control 14 sends a data signal/binary code to the tuner box 12 in response to a button selection, via step 20. The register 108 in the tuner box 12 within is used to receive the data signal for transfer to the graphics card 16, e.g., for example via an I2C bus. The data signal is then translated via the button mapping software to the appropriate control function 16, via step 22.

Thereafter, the appropriate control function is controlled within the PC, via step 24. For example, the application programming may include TV receiver programming, DVD player programming, DVR programming, and CD player programming as individual programs or alternatively, integrated programming, as is well appreciated by those skilled in the art. Thereafter, the button that controls the function can be activated, e.g., power ON/OFF, fast forward, record, etc., via step 26. By way of example, a look-up table provides a translation mechanism suitable for determining a function associated with activating a button of the remote control 14.

Figure 4:
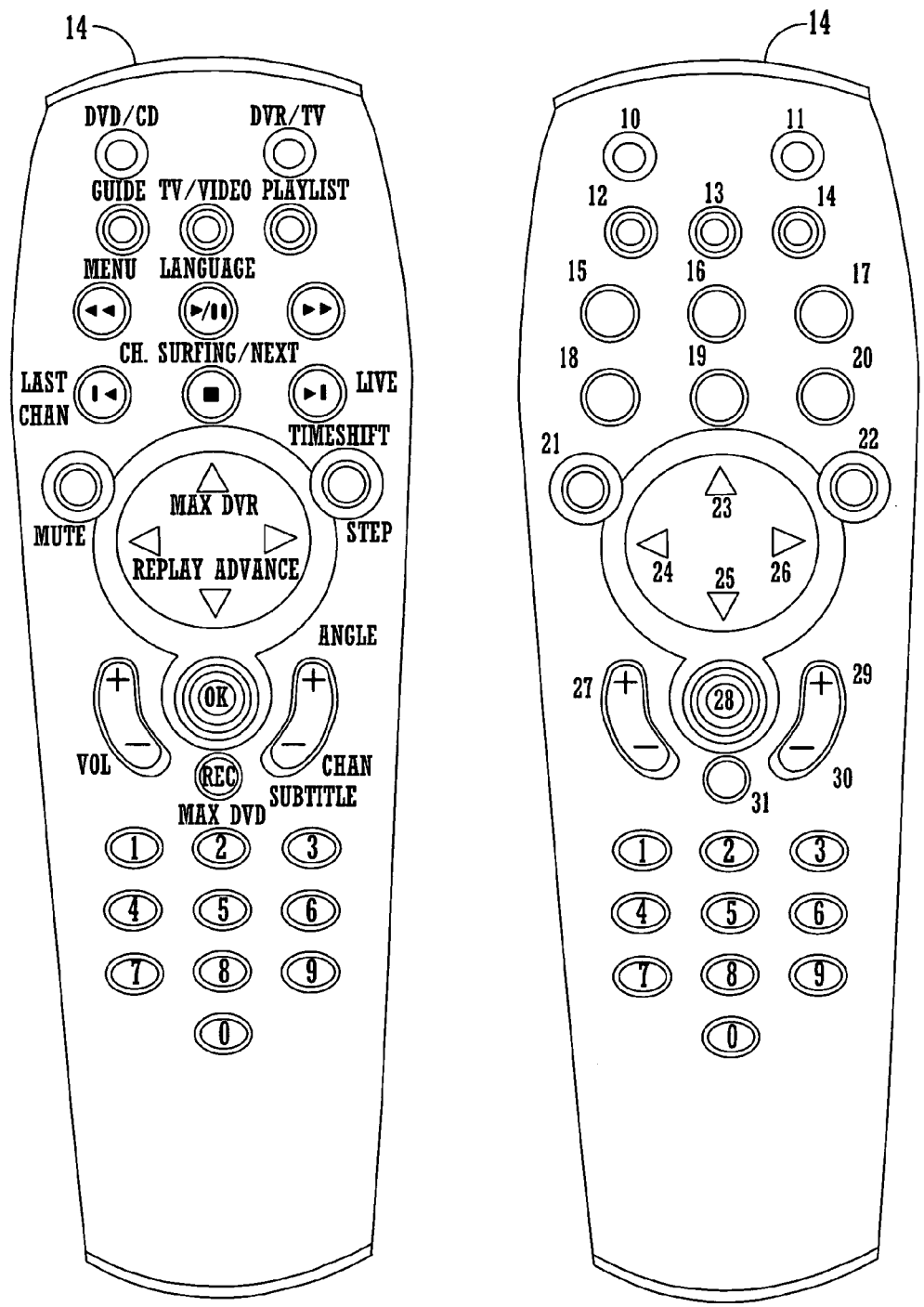
FIG. 4 illustrates a view of the remote control device with button mapping in accordance with a preferred embodiment of the present invention.

FIG. 4 illustrates a more detailed view of the remote control 14 and button numbers assignment. As is seen, buttons 0–9 provide channel numbers for the remote control and buttons 10–31 control various functions for the various A/V devices. As is also seen, the DVD/CD functions are controlled together and the TV/DVR functions are controlled together. Accordingly, as is seen, in this embodiment, button 10 controls the CD/DVD on/off function and the button 11 controls the TV/DVR on/off function. Accordingly button 11 has no effect if the CD/DVD function is on and button 10 has no effect if the TV/DVR function is on. As is further seen, the CD/DVD functions and TV/DVR functions (i.e., DVD root menu/EPG (button 12), DVD language select/video source select (button 13), enter/playlist (button 14, etc.) are controlled by pressing the buttons after function button 10 or 11 is pressed. As has been before mentioned, the control of the A/V devices is handled by button mapping software which translates the data signal from the remote control via the software driver 104. In a preferred embodiment, this translation is performed by utilizing a look-up table that associates a particular button with a particular function.

FIG. 5 illustrates an example of a look-up or translation table that associates a button number (keys) with the data signal/action key code (IR code) for each function necessary for DVR and DVD programming. As is seen, the pressing of each button provides a unique IR code. Each of the IR codes initiates a particular action. As above mentioned, buttons 0–9 have IR codes (0xx00–0xx09) that relate to the channel numbers for the remote control. Also as above mentioned, button 10 initiates the CD/DVD function via a specific IR code (0xx09). Buttons 12–31 thereafter provide specific functions via the IR codes (0xx12–0xx31) related to the CD/DVD function. Similarly, button 11 initiates the TV/DVR function, via a specific IR code (0xx10). Buttons 12–31 thereafter provide specific functions via the IR codes (0xx12–0xx31) related to the TV/DVR functions.

It should be understood that although a particular translation or look-up table with particular buttons providing specific IR codes is shown, it is illustrative only, and one of ordinary skill in the art readily recognizes that a variety of tables and IR codes could be utilized and their use is within the spirit and scope of the present invention. Accordingly, as is seen, utilizing the button mapping translation via a spreadsheet or other translation mechanism, the control of the different A/V devices in the PC can be provided utilizing one remote control.

Through the present invention, a multi-function wireless remote is disclosed which allows for full command of a plurality of A/V devices in a PC, such as a DVD player, TV receiver, Digital Video Recorder (DVR), and electronic programming guide. In this manner, PC users are ensured of a simplified and intuitive interactive PC/video experience. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for remotely controlling audio/visual (A/V) devices within a personal computer (PC), the method comprising:
   receiving data signals from a single control device;
   accessing a look-up table within a graphics card of said PC, said lookup table having a plurality of mappings between each of the data signals from said single control device and an appropriate control function for each of the A/V devices;
   translating the received data signals to particular control functions utilizing the look-up table; and
   controlling the operation of the A/V devices via the PC based on the particular control functions.

2. The method of claim 1 wherein the device functions further comprises a plurality of CD/DVD and TV/DVR functions.

3. A system for remotely controlling a plurality of audio/visual (A/V) devices, the system comprising:
   a single remote control device with selectable buttons for transmitting data signals wirelessly to access control of the plurality of A/V devices;
   a connection hardware, coupling the plurality of A/V devices and a personal computer (PC);
   a graphics card coupled to the PC, the graphics card for translating the data signals to appropriate control functions, wherein the selectable buttons are automatically associated with the appropriate control functions for a particular A/V device; and
   a graphics processing unit coupled within the PC based graphics card, said graphics processing unit for controlling the plurality of A/V devices utilizing the appropriate control functions.

4. The system of claim 3 wherein the connection hardware comprises a tuner box for coupling the plurality of A/V devices to the PC.

5. The system of claim 4 wherein the graphics card for translating the data signals to appropriate control functions further comprises a look up table for selecting and controlling operation of the plurality of A/V devices wherein a first set of the selectable buttons are mapped to select one or more A/V devices and a second set of the selectable buttons are mapped to control operation as a function of the selected one or more A/V devices.

6. The system of claim 5 wherein the tuner box comprises an infrared port receiver and a register to receive the data signals from the single remote control device and for transferring the received data signals to the graphics card.

7. The system of claim 3 wherein the control functions comprise one of a plurality of DVD and DVR functions.

8. A method for remotely controlling a plurality of audio/visual (A/V) devices within a personal computer (PC) utilizing one remote control, the remote control having a plurality of buttons, the method comprising:
   providing a data signal based upon activating at least one of the plurality of buttons from the one remote control, the at least one button for controlling one of the plurality of A/V devices;
   determining automatically within a graphics card in the PC a control function for a particular A/V device associated with the data signal based only on the activated at least one of the plurality of buttons and the particular A/V device the signal is associated with; and
   providing information from the graphics card for controlling the particular A/V device based on the control function.

9. A computer readable medium containing program instructions for remotely controlling audio/visual (A/V) devices within a personal computer (PC), the program instructions for:
   accessing a mapping stored on a graphics card of the PC, said mapping comprising a mapping of each button on a single remote control device to predetermined key codes, wherein a first set of buttons select operation of one or more A/V devices and a second set of buttons control operation as a function of the selected A/V device; and
   translating automatically data signals from a selected button to device functions via the PC based on the key codes.

10. The computer readable medium of claim 9 further comprising utilizing a look-up table containing mappings of each button to predetermined key codes for translating the data signals to device functions.

11. The computer readable medium of claim 10 wherein the device functions further comprise a plurality of CD/DVD and TV/DVR functions.

12. A method for remotely controlling audio/visual (A/V) devices within a personal computer (PC), the method comprising the steps of:
   (a) mapping each button on a single remote control device to predetermined key codes, wherein a first set of buttons select operation of one or more A/V devices and a second set of buttons control operation as a function of the selected A/V device;
   (b) storing the mapping in a look-up table in a graphics card in the PC;
   (c) receiving within the graphics card a first data signal corresponding to a selected one of the first set of buttons;
   (d) translating within the graphics card the first data signal to a first control function utilizing the look-up table to select operation of a particular A/V device coupled to a PC;
   (e) receiving within the graphics card a second data signal corresponding to a selected one of the second set of buttons; and
   (f) translating within the graphics card the second data signal to a second control function utilizing the look-up table to control operation of the particular A/V device coupled to the PC, wherein the selected one of the second set of buttons is automatically associated with an appropriate control function for the particular A/V device.

13. A system for remotely controlling a plurality audio/visual (A/V) devices within a personal computer (PC), the system comprising:
   a single remote control device with selectable buttons for transmitting data signals wirelessly;
   a tuner box coupled to the PC, the plurality of A/V devices and the remote control device, for receiving the data signals for transfer to the PC; and
   the PC having a graphics board for automatically translating the data signals to appropriate control functions for selecting and controlling operation of the plurality of A/V devices utilizing a look-up table wherein a first set of the selectable buttons are mapped to select one or more A/V devices and a second set of the selectable buttons are mapped to control operation as a function of the selected one or more A/V devices.

14. A computer readable medium for remotely controlling audio/visual (A/V) devices within a personal computer (PC), the method comprising:
   mapping each button on a single remote control device to predetermined key codes in a look-up table stored in a graphics card in the PC, wherein a first set of buttons select one or more A/V devices and a second set of buttons control operation of each of the selected A/V devices and wherein a graphical user interface is not necessary;
   translating automatically data signals from the single remote control to device functions utilizing the look-up table, wherein the data signals include one or more of the predetermined key codes, and wherein an input of the data signals from the single remote control is the only input required for the translating; and
   controlling selection and operation of the A/V devices via the graphics board in the PC based on the device functions.

15. A system for remotely controlling a plurality of audio/visual (A/V) devices within a personal computer (PC), the system comprising:
   a tuner box, coupled to a graphics board within the PC and the plurality of A/V devices, having an infrared port receiver and a register for receiving data signals for transfer to the PC;
   a single remote control device with selectable buttons for transmitting the data signals wirelessly to access control of the plurality of A/V devices;
   the PC having a graphics board including a button mapping software for automatically translating the data signals to appropriate control functions and a software driver for providing information for controlling the plurality of A/V devices according to the appropriate control function, wherein a first set of the data signals are mapped to select one or more A/V devices and a second set of the data signals are mapped to control operation of the selected one or more A/V devices.

* * * * *